United States Patent
Ausman et al.

(10) Patent No.: US 7,622,818 B2
(45) Date of Patent: Nov. 24, 2009

(54) BACKUP ELECTRICAL POWER SYSTEM FOR SOLID-STATE AIRCRAFT POWER DISTRIBUTION SYSTEMS

(75) Inventors: Marc Ausman, Albuquerque, NM (US); Kevin DeVries, Albuquerque, NM (US); Jake Dostal, Albuquerque, NM (US)

(73) Assignee: Vertical Power, Inc., Albuquerque, NM (US)

( * ) Notice: Subject to any disclaimer, the term of this patent is extended or adjusted under 35 U.S.C. 154(b) by 74 days.

(21) Appl. No.: 11/875,815

(22) Filed: Oct. 19, 2007

(65) Prior Publication Data

US 2008/0036298 A1 Feb. 14, 2008

Related U.S. Application Data

(63) Continuation-in-part of application No. 11/311,060, filed on Dec. 19, 2005, now abandoned.

(60) Provisional application No. 60/853,712, filed on Oct. 23, 2006.

(51) Int. Cl.
*B60L 1/00* (2006.01)
(52) U.S. Cl. .................... 307/9.1
(58) Field of Classification Search .............. 307/9.1
See application file for complete search history.

(56) References Cited

U.S. PATENT DOCUMENTS

| | | | |
|---|---|---|---|
| 3,581,276 A * | 5/1971 | Newman | 340/425.5 |
| 4,127,847 A | 11/1978 | Stifter | |
| 4,191,347 A | 3/1980 | Fueyo | |
| 4,243,970 A | 1/1981 | Hardee et al. | |
| 4,409,635 A | 10/1983 | Kraus | |
| 4,452,207 A | 6/1984 | Moore, Jr. | |
| 4,598,890 A | 7/1986 | Herzog et al. | |
| 4,649,484 A | 3/1987 | Herzog et al. | |
| 4,757,249 A * | 7/1988 | Farber et al. | 320/126 |
| 5,082,208 A | 1/1992 | Matich | |
| 5,353,657 A | 10/1994 | Bainbridge, III | |
| 5,497,072 A | 3/1996 | LeComte et al. | |
| 5,723,915 A | 3/1998 | Maher et al. | |
| 5,864,221 A | 1/1999 | Downs et al. | |
| 5,913,492 A | 6/1999 | Durandeau et al. | |
| 5,941,222 A | 8/1999 | Braly | |
| 6,325,333 B1 | 12/2001 | Najmabadi et al. | |
| 6,346,892 B1 | 2/2002 | DeMers et al. | |
| 6,556,902 B2 | 4/2003 | Ing et al. | |

(Continued)

OTHER PUBLICATIONS

Web pages at http://www.tcwtech.com/, (visited on Jan. 26, 2008 and Jan. 27, 2008).

*Primary Examiner*—Robert L. Deberadinis
(74) *Attorney, Agent, or Firm*—V. Gerald Grafe

(57) ABSTRACT

A system comprised of switches, fuses, microprocessor-based monitoring, and a pilot display that provides a method to bypass computer-controlled switching of aircraft power circuits. A backup circuit in addition to the computer-controlled switching circuit provides a method to guarantee power delivery in the case of a failure of the computer-controlled switch. The system provides the pilot with an indication when the backup circuit is engaged. When the other devices are turned off and/or the engine is shut down, an indication can be provided to the pilot that the backup circuit is on. An indication can also be provided to the pilot that the switch is in the off position when it should be on.

22 Claims, 1 Drawing Sheet

U.S. PATENT DOCUMENTS

| | | |
|---|---|---|
| 6,639,522 B2 | 10/2003 | Derderian |
| 6,664,945 B1 | 12/2003 | Gyde et al. |
| 6,700,482 B2 | 3/2004 | Ververs et al. |
| 6,754,567 B2 | 6/2004 | Bernard |
| 6,824,099 B1 | 11/2004 | Jones |
| 6,842,672 B1 | 1/2005 | Straub et al. |
| 6,859,688 B1 | 2/2005 | Orf et al. |
| 7,021,587 B1 | 4/2006 | Younkin |
| 7,039,518 B2 | 5/2006 | Ingram et al. |
| 2007/0120694 A1* | 5/2007 | Lindsey et al. .............. 340/662 |

* cited by examiner

BACKUP ELECTRICAL POWER SYSTEM FOR SOLID-STATE AIRCRAFT POWER DISTRIBUTION SYSTEMS

CROSS-REFERENCE TO RELATED APPLICATIONS

This Application claims benefit of 60/853,712 filed Oct. 23, 2006 and is a CIP of application Ser. No. 11/311,060 filed Dec. 19, 2005 now abandoned.

This application is related to the following applications, each of which is incorporated herein by reference:

Aircraft Emergency Handling, U.S. patent application Ser. No. 11/875,813 . . .

Aircraft Electrical System Evaluation, U.S. patent application Ser. No. 11/875,816 . . .

Aircraft Exhaust Gas Temperature Monitor, U.S. patent application Ser. No. 11/875,818 . . .

Variable Speed Flap Retraction and Notification, U.S. patent application Ser. No. 11/875,819 . . .

FIELD OF THE INVENTION

This invention relates to the field of aircraft control, and more specifically to systems that provide backup power supply for aircraft electrical systems.

BACKGROUND

The present invention relates to avionics. Modern commercial/private aircraft, as well as older aircraft, generally include a myriad of instrumentation panels associated with electronic devices having controls, displays, and software applications, which are used to present information to pilots and/or copilots during flight. The electronic devices, controls, displays and applications are interfaced together to form avionics equipment within the aircraft. Pilots (where "pilot" includes copilots and any other controller of the aircraft) access one or more interface devices of the avionics equipment prior to and during the flight. Some of this information presented monitors the status of equipment on the aircraft, while other switches and knobs are used to control functions of the aircraft such as throttles (engine speed), switches (lights, radios, etc), levers (landing gear and flaps), and controls for navigation, for example.

Recently, aircraft are moving away from mechanical and analog avionics to digital avionics. This greater demand on the electrical system has given rise to the need for intelligent power distribution systems. Some power distribution systems may be suitable for use in aircraft, for example those described in U.S. Pat. No. 5,864,221 (Dedicated avionics standby power supply); U.S. Pat. No. 5,723,915 (Solid state power controller); U.S. Pat. No. 5,497,072 (Solid state power controller with power switch protection apparatus); and U.S. Pat. No. 4,409,635 (Electrical power system with fault tolerant control unit); each of which is incorporated herein by reference. Some proposed power distribution systems use microprocessors and solid-state switches (Field Effect Transistors or similar) to switch devices on and off. However, in the case of flight critical devices that require constant power, a failure of the microprocessor or solid-state switch could adversely affect the safety of flight. Currently there are no intelligent backups for this type of failure.

SUMMARY OF THE INVENTION

The present invention provides methods and apparatuses for providing a backup power circuit, detecting the status of that circuit, and displaying circuit status and alerts to the pilot. Circuit status and alerts can be displayed on various types of indicators or screens such as an indicator light, or on a character or graphic display screen such as a liquid crystal display. A system comprised of switches, fuses, microprocessor-based monitoring, and a pilot display that provides a method to bypass computer-controlled switching of aircraft power circuits. A backup circuit in addition to the computer-controlled switching circuit provides a method to guarantee power delivery in the case of a failure of the computer-controlled switch. The system provides the pilot with an indication when the backup circuit is engaged. When the other devices are turned off and/or the engine is shut down, an indication can be provided to the pilot that the backup circuit is on.

DETAILED DESCRIPTION OF THE INVENTION

Figure 1:
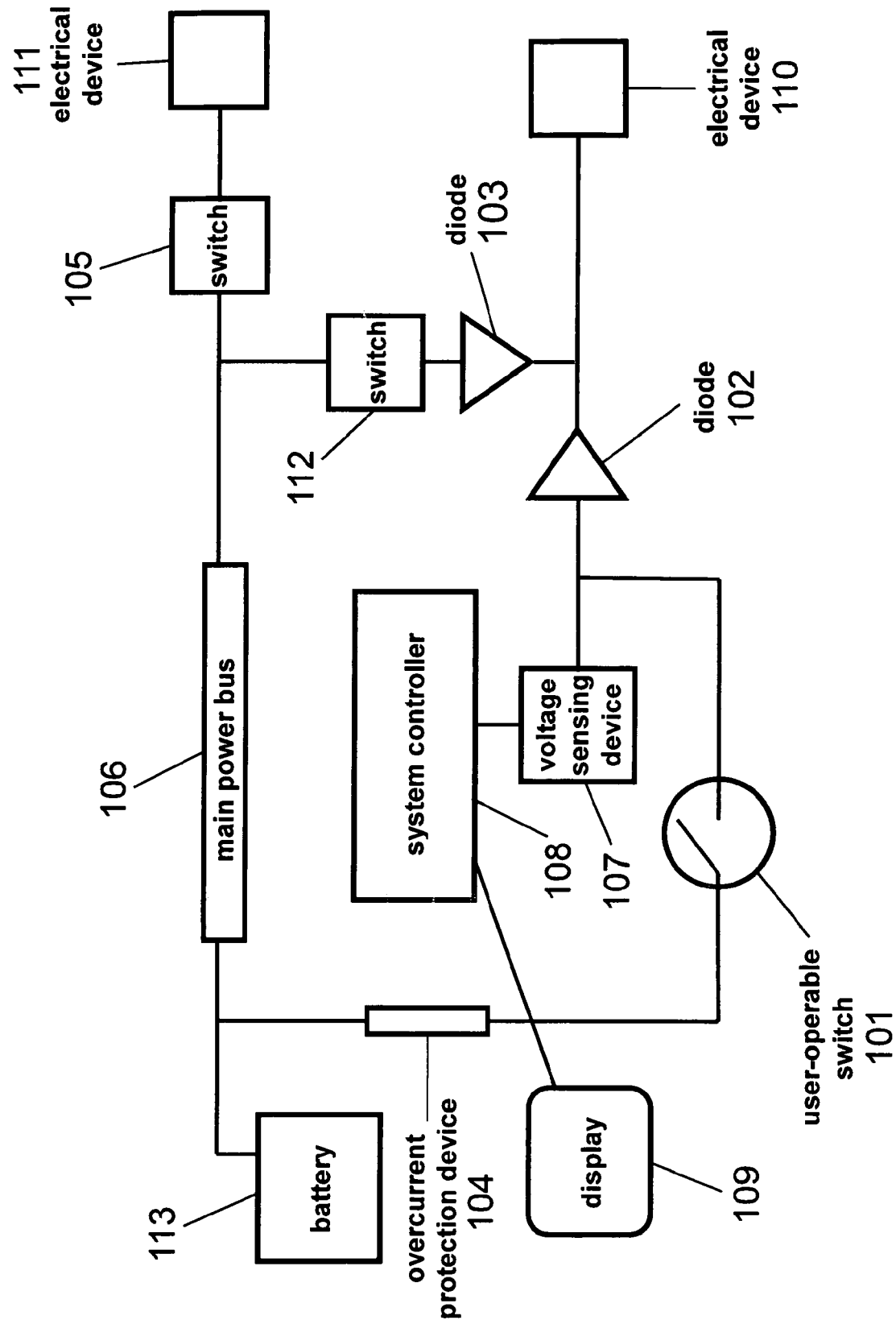
FIG. 1 is a schematic depiction of an example embodiment of the present invention, shown in context of a typical aircraft electrical power distribution system.

FIG. 1 is a schematic illustration of an example backup power system according to the present invention, shown in context of a typical aircraft electrical power distribution system. An aircraft battery 113 (or other source of electrical energy such as an alternator, fuel cell, or other generation system) is in electrical communication with a main power bus 106. The main power bus 106 is in electrical communication with a first switch 105 (such as a field effect transistor switch or "FET", a metal oxide semiconductor field effect transistor or "MOSFET", or a circuit that provides electrical control as well as overvoltage control, overcurrent control, voltage or current filtering or conditioning, etc.), and with a second switch 112 (such as a FET, MOSFET, or circuit as with the first switch). The first switch 105 is in electrical communication with one or more electrical devices 111, which draw electrical power from electrical energy flowing through the first switch 105. The system can accommodate multiple such switches, each controlling power to one or more electrical devices. The second switch 112 is in electrical communication with a second directional current control device 103 (such as a diode, e.g., a 60V 10 A Schottky diode can be suitable for some typical aircraft systems). The second directional current control device 103 is in electrical communication with one or more electrical devices 110, which draw electrical power from electrical energy flowing through the second directional current control device 103. The system can accommodate multiple such switches and directional current control devices, each controlling power to one or more electrical devices. Alternatively, the order of the second switch and the directional current control device can be changed, such that a single directional current control device can be in electrical communication with multiple such switches.

An overcurrent protection device 104 (such as a fuse, e.g. a 5 A fuse can be suitable for some typical aircraft systems) is in electrical communication with the battery, and with a first terminal of a user-operable switch 101 such as a SPST switch. A second terminal of the user-operable switch 101 is in electrical communication with a first directional current control device 102 (such as a diode, e.g., a 60V 10 A Schottky diode can be suitable for some typical aircraft systems), which is in electrical communication with one or more electrical devices 110. A voltage sensing device 107, such as an analog/digital converter, senses voltage at the second terminal of the user-operable switch 101 (alternatively, a current sensing device can sense current flowing between the user-operable switch 101 and the first directional current control device 102), and communicates an indication of such voltage (or current) to a system controller 108 (e.g., a microprocessor such as an Atmel Atmega processor (Atmel and Atmega are trademarks). The system controller 108 can communicate with a pilot responsive the indication from the voltage sensing device 107 (or current sensing device), for example by presenting information on a display 109 such as an LCD display.

In normal (no backup) operation, electrical energy from the battery 113 is communicated the main power bus 106, and thence to the first set of electrical devices 111 via the first switch 105 and to the second set of electrical devices 110 via the second switch 112 and the second directional current control device 103. The first directional current control device 102 prevents electrical energy from the main power bus 106 from being transmitted to the voltage sensor 107.

In the event of a fault or other condition that interrupts power from the main bus to one of the second set of devices 110, user closure of the user-operable switch 101 can provide backup power to the device. Activation of the user-operable switch 101 allows electrical energy to be communicated directly from the battery 113 through the overcurrent protection device 104 and the user-operable switch 101 and the first directional current control device 102 to the device 110. The path for the electrical energy is not susceptible to failure of a system controller or an electrically-controlled switch, resulting in a highly reliable power supply to the critical device 110.

When the user-operable switch 101 is closed, electrical energy can be sensed by the voltage sensor 107 and indicated to the system controller 108. This indication can be used to communicate to the pilot that the user-operable switch 101 is closed and that electrical power to the devices 110 is no longer under control of the second switch 112. This can be used as to confirm to the pilot that the backup power circuitry is operating. It can also be useful when the aircraft is placed in a shutdown state (e.g., the engine is shut down, or the aircraft is placed in a condition where the aircraft is to enter an inoperative or storage state), since continued operation of the backup power circuitry can drain the battery. As examples, a visual display, audible warning, or control of some other device (e.g., flashing the cockpit lights) can be used to alert a pilot that the backup power circuitry is still operating.

The display 109 can use one or more inputs to determine that the switch should be in the off position, including engine data (such as RPM), or GPS groundspeed, or status of other electrical devices, depending on the specific application. This can be realized, for example, if the display is controlled by a single board computer that also receives inputs from other aircraft systems, depending on the specific application. A software algorithm, specific to the application, can determine whether the switch 101 should be on or off. If it is on when it should be off, the pilot can be alerted through any of various systems (e.g., visible signal, audible alert, change in a visible display, etc.) to move the switch to the off position. The system can additionally use a variety of inputs to determine if the switch should be on. If it is off when it should be on, the pilot is alerted through any of various systems (e.g., visible signal, audible alert, change in a visible display, etc.) to move the switch to the on position.

The particular sizes and equipment discussed above are cited merely to illustrate particular embodiments of the invention. It is contemplated that the use of the invention can involve components having different sizes and characteristics. It is intended that the scope of the invention be defined by the claims appended hereto.

We claim:

1. A backup electrical supply system for an aircraft having a power supply, and an electrically controllable switch adapted to communicate electrical energy from the power supply to one or more electrical loads, comprising:
   a. A user-operable switch having a first terminal in electrical communication with the power supply, and having a second terminal;
   b. A first directional current control device having first and second terminals, adapted to permit electrical energy to pass from the first terminal to the second terminal but substantially prevent electrical energy from passing from the second terminal to the first terminal, with the first termination in electrical communication with the second terminal of the user-operable switch;
   c. A second directional current control device having first and second terminals, adapted to permit electrical energy to pass from the first terminal to the second terminal but substantially prevent electrical energy from passing from the second terminal to the first terminal, with the first termination in electrical communication with an output of the electrically controllable switch, and the second terminal in electrical communication with the second terminal of the first directional current control device;
   d. Wherein second terminals of the first and second directional current control devices can be placed in electrical communication with one or more electrical loads.

2. A system as in claim 1, further comprising an overcurrent protection device mounted either between the power supply and the user-operable switch or between the user-operable switch and the first directional current control device.

3. A system as in claim 1, further comprising an electrical energy sensor mounted so as to sense electrical energy in communication with the second terminal of the user-operable switch, and further comprising an indicator that is activated when the electrical energy sensor senses electrical energy above a threshold value.

4. A system as in claim 3, wherein the indicator system comprises a control system and a display, adapted to display to the pilot a visual indication corresponding to the sensing of electrical energy above the threshold value.

5. A system as in claim 3, wherein the indicator system comprises an audible signal provided when the energy sensed is above a threshold and the aircraft engine has been shut down and groundspeed is substantially zero.

6. A system as in claim 1, wherein the first and second directional current control devices are diodes.

7. An aircraft electrical control and distribution system, comprising:
   a. An electrical power source;
   b. A main power bus;
   c. A first diode;
   d. A first electrically controllable switch adapted to communicate electrical energy from the main power bus to the input of the first diode;
   e. A second diode;
   f. A user-operable switch, adapted to communicate electrical energy from the power supply to the input of the second diode responsive to user actuation of the user-operable switch;
   g. Wherein the outputs of the first and second diodes are in electrical communication with each other and with one or more first electrical loads.

8. A system as in claim 7, wherein the power supply comprises a battery, an alternator, a generator, or a combination thereof.

9. A system as in claim 7, further comprising a voltage sensor adapted to sense voltage present at the input of the second diode.

10. A system as in claim 9, further comprising an indicator adapted to provide an indication to a pilot responsive to a signal from the voltage sensor.

11. A system as in claim 10, wherein the indicator comprises a controller and a display, and wherein the indication comprises a configuration of the display to communicate to the pilot the signal from the voltage sensor.

12. A system as in claim 10, wherein the indicator comprises an audible or visible signal communicated to a pilot if the voltage sensed by the voltage sensor exceeds a threshold value and aircraft sensors indicate that the aircraft is in a condition where the voltage sensor should not indicate a value exceeding the threshold.

13. A system as in claim 10, wherein the indicator comprises a controller and a display, and wherein the indication comprises a configuration of the display to communicate to the pilot the signal from the current sensor.

14. A system as in claim 10, wherein the indicator comprises an audible or visible signal communicated to a pilot if the current sensed by the current sensor exceeds a threshold value and aircraft sensors indicate that the aircraft is in a condition where the voltage sensor should not indicate a value exceeding the threshold.

15. A system as in claim 10, wherein the indicator comprises an audible or visible signal communicated to a pilot if the voltage sensed by the voltage sensor is below a threshold value.

16. A system as in claim 10, wherein the indicator comprises an audible or visible signal communicated to a pilot if the current sensed by the current sensor is below a threshold value.

17. A system as in claim 9, further comprising an indicator adapted to provide an indication to a pilot responsive to a signal from the current sensor.

18. A system as in claim 7, further comprising a current sensor adapted to sense current flowing from the power supply to the input of the second diode.

19. A system as in claim 7, further comprising a second electrically controllable switch, adapted to communicate electrical energy from the main power bus to one or more second electrical loads.

20. A system as in claim 19, wherein the one or more second electrical loads comprise one or more electrical devices whose failure would not jeopardize the safe operation of the aircraft.

21. A system as in claim 7, wherein the one or more first electrical loads comprise one or more electrical devices whose failure would jeopardize safe operation of the aircraft.

22. An electrical system for an aircraft having power distribution system, wherein a power supply can be connected to an electrical device using an electrically-controlled switch, comprising:
   a. A failsafe switch to a power supply
   b. A diode connected between the failsafe switch and the electrical device;
   c. An electrical sensor adapted to generate a signal representative of electrical power between the failsafe switch and the diode;
   d. An indication system adapted to communicate the presence, absence, or level of electrical power between the failsafe switch and the diode.

\* \* \* \* \*